(12) United States Patent
Choi et al.

(10) Patent No.: US 6,195,388 B1
(45) Date of Patent: Feb. 27, 2001

(54) APPARATUS AND METHOD FOR ENCODING MULTIPLE VIDEO PROGRAMS

(75) Inventors: Jae Gark Choi; Chie Teuk Ahn; Sung Hoon Hong, all of Daejeon (KR)

(73) Assignee: Electronics and telecommunications Research Institute, Daejeon (KR)

( * ) Notice: Subject to any disclaimer, the term of this patent is extended or adjusted under 35 U.S.C. 154(b) by 0 days.

(21) Appl. No.: 09/116,903

(22) Filed: Jul. 17, 1998

(30) Foreign Application Priority Data

Nov. 27, 1997 (KR) .................................................. 97-63552

(51) Int. Cl.[7] ...................................................... H04N 7/12
(52) U.S. Cl. ................................ 375/240.05; 375/240.03
(58) Field of Search ......................... 375/240.02, 240.03, 375/240.05, 240.07; 348/385.1, 387.1, 6–7, 16–17; 455/3.1, 4.1–4.2, 5.1, 6.1

(56) References Cited

U.S. PATENT DOCUMENTS

| | | | | |
|---|---|---|---|---|
| 5,216,503 | * | 6/1993 | Paik et al. .............................. | 348/390 |
| 5,550,590 | * | 8/1996 | Sakazawa et al. .................... | 348/387 |
| 5,606,369 | * | 2/1997 | Keesman et al. ..................... | 348/385 |
| 5,708,664 | * | 1/1998 | Budge et al. ......................... | 370/538 |
| 5,717,464 | * | 2/1998 | Perkins et al. ....................... | 348/419 |
| 5,805,220 | * | 9/1998 | Keesman et al. .................... | 348/385 |
| 5,861,919 | * | 1/1999 | Perkins et al. ....................... | 348/385 |
| 5,929,916 | * | 7/1999 | Legall et al. ......................... | 348/419 |
| 6,028,632 | * | 2/2000 | Siong et al. .......................... | 348/385 |
| 6,038,256 | * | 3/2000 | Linzer et al. ......................... | 375/240 |

OTHER PUBLICATIONS

Lau et al, "Statistical Multiplexing and Buffer Sharing in Multimedia High–Speed Networks: A Frequency Domain Perspective", IEEE, 1997.*

Ding, "Joint Encoder and Channel Rate Control of VBR Video over ATM Networks" IEEE, 1997.*
Jordan et al, "Analysis, Modeling and Performance Prediction of Digital Video Statistical Multiplexing", IEEE, 1997.*
Balakrishman et al, "Benefits of Statistical Multiplexing in Multi–Program Broadcasting", IEEE, 1997.*
Wakamiya et al, "Effectiveness of MPEG–2 Video Transmission on ATM Links–Is Statistical Multiplexing Really Useful for Bursty Video Transmission?", IEEE, 1997.*
Limin Wang et al., "Multi–Program Video Coding with Joint Rate Control", 1996 IEEE, pp. 1516–1520.
Limin Wang et al., "Bit–Allocation for Joint Coding of Multiple Video Programs", SPIE vol. 3024, pp. 149–158.
Ajanta Guha et al., "Multichannel Joint Rate Control of VBR MPEG Encoded Video for DBS Applications", IEEE Transactions on Consumer Electronics, vol. 40, No.3, Aug. 1994.
Barry G. Haskell, "Multiplexing of Variable Rate Encoded Streams", IEEE Transactions on Circuits and Systems for Video Technology, vol. 40, No. 4, Aug. 1994, pp. 417–424.

* cited by examiner

Primary Examiner—Vu Le
(74) Attorney, Agent, or Firm—Jacobson, Price, Holman & Stern, PLLC

(57) ABSTRACT

A video encoding apparatus includes a plurality of encoders for encoding each of a plurality of video programs received from external; a multiplexer for multiplexing outputs of the plurality of encoding means; a buffer for temporarily storing and transmitting signal multiplexed by the multiplexer; and a central controller for receiving monitoring information with respect to buffer fullness from the buffer and providing quantization parameters to be applied to respective pictures to be now encoded with the respective encoders. The sum of the bit rates of all the multiplexed video programs is constant, but each of the video programs allows for a variable bit rate (VBR) by synchronously controlling each of a video encoders by means of the central controller, thereby maintaining a relatively uniform picture quality within one picture.

6 Claims, 6 Drawing Sheets

APPARATUS AND METHOD FOR ENCODING MULTIPLE VIDEO PROGRAMS

BACKGROUND OF THE INVENTION

1. Field of the Invention

The present invention relates generally to an apparatus and method for transmitting a plurality of multiplexed video programs over a channel of allowing for a constant bit rate (CBR), and particularly to an encoding apparatus and its method for multiple video programs transmission in which the sum of the bit rates of all the multiplexed video programs is constant, but each of the video programs allows for a variable bit rate (VBR) by synchronously controlling each of video encoders by means of a central controller.

2. Description of the Prior Art

Generally, when a plurality of video programs are transmitted through a single channel of allowing for only the CBR, each of them is encoded independently by it's own video encoder at the CBR compression, and then is multiplexed to transmit the aggregate bit stream.

Such a prior art will now be explained in detail with reference to FIG. 1. FIG. 1 shows a blockdiagram of a video encoding apparatus for transmitting multiple video programs. The video encoding apparatus includes an encoding unit 110 for encoding video programs received from each of video sources 1 to video sources N according to bit rate control by means of respective bit rate controllers 121, 123, and 125, a bit rate controlling unit 120 for controlling bit rates of the respective encoders 111, 113, and 115 according to buffer informations from the respective buffer 131, 133, and 135, a buffer unit 130 for storing outputs of the respective encoders 111, 113, and 115 and transferring them to a multiplexer (MUX) 140, the MUX 140 for multiplexing the outputs of the respective buffers 131, 133, and 135, and a network interface 150 for transmitting the output of the MUX 140 through a channel of allowing for a CBR transmission.

In the prior art apparatus shown in FIG. 1, every encoder 111, 113, or 115 includes independently buffers 131, 133, and 135 and bit rate controller 121, 123, and 125 to execute independent coding for compression.

There are, however, two main shortcomings with independent coding at a constant bit rate. First, the program content can vary significantly from program to program as well as within a program. This variation can lead to large fluctuations in picture quality among programs and within a program, so that a picture of an acceptable picture quality can not be provided with all users fairly. Second, if bandwidth is allocated in order to guarantee the acceptable picture quality with respect to all video programs, unnecessarily wide bandwidth may be allocated to video program having simple picture. That is, when the same rate is used for all types of pictures regardless content, bandwidth or channel capacity is effectively wasted, so that the number of programs capable of transmitting over a single channel is reduced.

SUMMARY OF THE INVENTION

An object of the present invention is to provide an encoding apparatus and its method for multiple video programs transmission in which the sum of the bit rates of all the multiplexed video programs is constant, but each of the video programs allows for a variable bit rate by synchronously controlling each of video encoders of respective video programs transmitted over a constant bit rate channel by means of a central controller.

To achieve the above object, the present invention discloses a video encoding apparatus for multiple video programs transmission comprising a plurality of encoding means for encoding each of a plurality of video programs received from external; multiplexing means for multiplexing outputs of the plurality of encoding means; storing means for temporarily storing and transmitting signal multiplexed by the multiplexing means; and central controlling means for receiving monitoring informations necessary for control from the plurality of encoding means and informations with respect to storing means fullness from the storing means and providing quantization parameters to be applied to respective pictures to be now encoded with the respective encoding means.

According to another aspect of the present invention, the invention discloses a video encoding method for multiple video programs transmission comprising the steps of allocating a total amount of bits to be allocated to all pictures to be encoded per every frame frequency; receiving a plurality of monitoring informations from respective encoders and estimating a plurality of estimating values of bit generating amounts and a plurality of estimating values of distortions corresponding to quantization parameters to be applied to present frames of respective programs to be encoded; estimating a target distortion to be generated when all the programs jointly coded according to the total target amount of bits maintains closest picture qualities; and selecting quantization parameters to be used for encoding so that distortions generated from the respective programs which are encoded is closest to a target distortion, and encoding the respective program pictures using the selected quantization parameters.

First, a principle of encoding video programs according to the present invention will now be explained.

For the encoded picture to maintain a certain picture quality, its bit amount to be used for coding shall vary as their respective picture complexities. The variable bit rate (VBR) compression can maintain the picture quality of the encoded picture more uniform than the constant bit rate (CBR) compression, since bit rates from the encoders can vary according to an amount of bit requested by the picture.

Further, generally, since decreasing effect on distortion according to increases in the amount of bit in case of the complex picture is larger than that of the simple picture, the VBR compression can provide more improved picture quality than the CBR compression.

In this respect, it is known that the VBR compression is more effective than the CBR compression. Nevertheless, only the CBR compression has to be used in the application of transmitting an picture information through the conventional channel allowing for only the CBR.

With new video compression tehcnology, such as MPEG-2 (moving picture expert group-2), and digital transmission technology, it allows for multi-program transmission environment in which the multiple video programs are delivered synchronously through a conventional transmission channel band. Such an environment is, for example, digital satellite broadcast, cable TV, and digital terrestrial broadcast.

In such a multi-program transmission environment, advantage of the VBR compression is obtained by transmitting the multiple video programs at the VBR compression, and a method to execute such a VBR compression may consider a statistical multiplexing method and joint coding method which is proposed in the present invention.

In this case, the statistical multiplexing is generally used in an asynchronous transfer mode (ATM), and is based on the fact that if a plurality of VBR video traffics are received at network, the sum of all the bit rates is substantially constant. When the VBR video programs are statistically multiplexed to transmit it through the CBR channel, however, if the number of video programs multipleded is small, it is doubtful to obtain multiplexing effects, and if the respective programs synchronously produce bitstreams at high bit rate, many cell losses are occurred. Since all of channel capacity can not be used to prevent such cell loss, use efficiency of the channel is decreased.

In the joint coding, bit rates of the respective video programs are variable by synchronously controlling video encoders of producing respective video programs compressed at the VBR by means of a central controller, but the sum of the bit rates of all the multiplexed video programs is constant.

Therefore, this joint coding method is effective in case of multiplexing small number of the video programs, which is different from the statistical multiplexing, and all the channel bandwidth can be used, so that this joint coding method is more effective in the multiple transmission environment of video programs. When joint coding in the multiple transmission environment of video programs, matters to be considered are as follows:

(1) Sum of bit rates of all the video programs has to be less than the CBR channel bandwidth. If the sum of bit rates is larger than the CBR channel bandwidth, information's loss occurs and picture quality of the reproduced picture is degraded largely.

(2) It is requested that the difference of the picture qualities among the video pictures be small. If not being satisfied with this condition, fair services are not provided with all viewers.

The present invention proposes such joint coding method which can be exactly satisfied with the above matters to be considered, which executes exact bit rate control using bit producing amounts which corresponds to the quantization parameter applied to video coding, and distortion estimating results.

The proposed joint coding method is executed according to a next following three steps:

(1) Total target bit estimating step: This step estimates a total amount of bits to be allocated to all pictures to be encoded per every frame frequency.

(2) Target distortion estimating step: This step estimates a smallest (target) distortion to be generated when all the programs jointly coded according to the total target amount of bits maintains closest picture qualities.

(3) quantization parameter selecting and encoding step: This step selects quantization parameters to be used for encoding so that distortions generated from the respective programs which are encoded is closest to the target distortion, and encoding the respective program pictures using the selected quantization parameters.

Accordingly, since the same quantization parameter is applied to one picture, this invention can maintain a relatively uniform picture quality within one picture.

The present invention estimates the bit amount and the distortion with respect to the present frame of the respective programs to be encoded, and executes the joint coding using the estimating results. In this case, to estimate the bit amount and distortion means to estimate the bit amount and the distortion occurring from the picture at the time of applying the same quantization parameter for the picture at one frame. If the number of quantization parameters applicable to encoding step is 31, each of the bit amount and distortion corresponding to each of quantization parameters have to be estimated. Estimating values of the bit amount and distortion will now be expressed as follows: where the quantization parameter applied to one frame of kth program to be now encoded is QPn, estimating values of the bit generating amount and distortion are expressed as $\hat{E}_k(QPn)$ and $\hat{D}_k(QPn)$, respectively.

Step of executing joint coding according to the present invention is as follows:

First, a total target bit estimating step is performed to estimate a total amount of bits to be allocated to all pictures to be encoded per every frame frequency. Next, a target distortion estimating (target bit re-allocating) step is performed for estimating a smallest (target) distortion to be generated when all the programs jointly coded according to the total target amount of bits maintains closest picture qualities and re-allocating the target amount of bits corresponding to the target distortion for picture of the respective programs to be now encoded. Then, a quantization parameter selecting and encoding step is performed for selecting quantization parameters to be used for encoding so that distortions generated from the respective programs which are encoded is closest to the target distortion, and encoding the respective program pictures using the selected quantization parameters, thereby maintaining a relatively uniform picture quality within one picture.

BRIEF DESCRIPTION OF THE DRAWINGS

Other features and objects of the present invention will be apparent from the following description in connection with the accompanying drawings.

DETAILED DESCRIPTION OF THE PREFERRED EMBODIMENTS

A video encoding apparatus and method for multiple video transmission according to an embodiment of the present invention will now be described in detail with reference to the attached FIG. 2 to FIG. 6.

Figure 1:
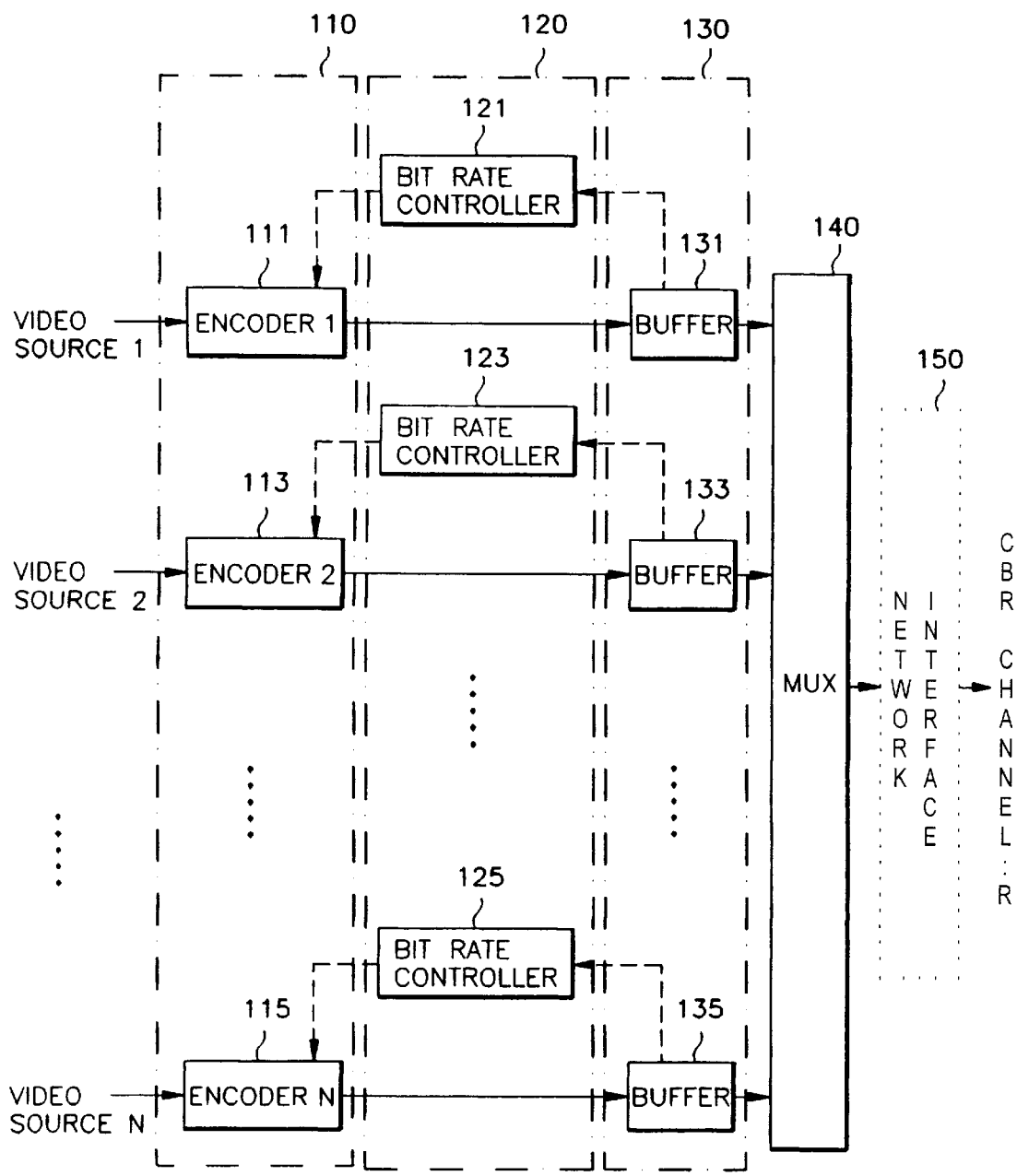
FIG. 1 is a block diagram showing a prior art video encoding apparatus for multiple video transmission.
Figure 2:
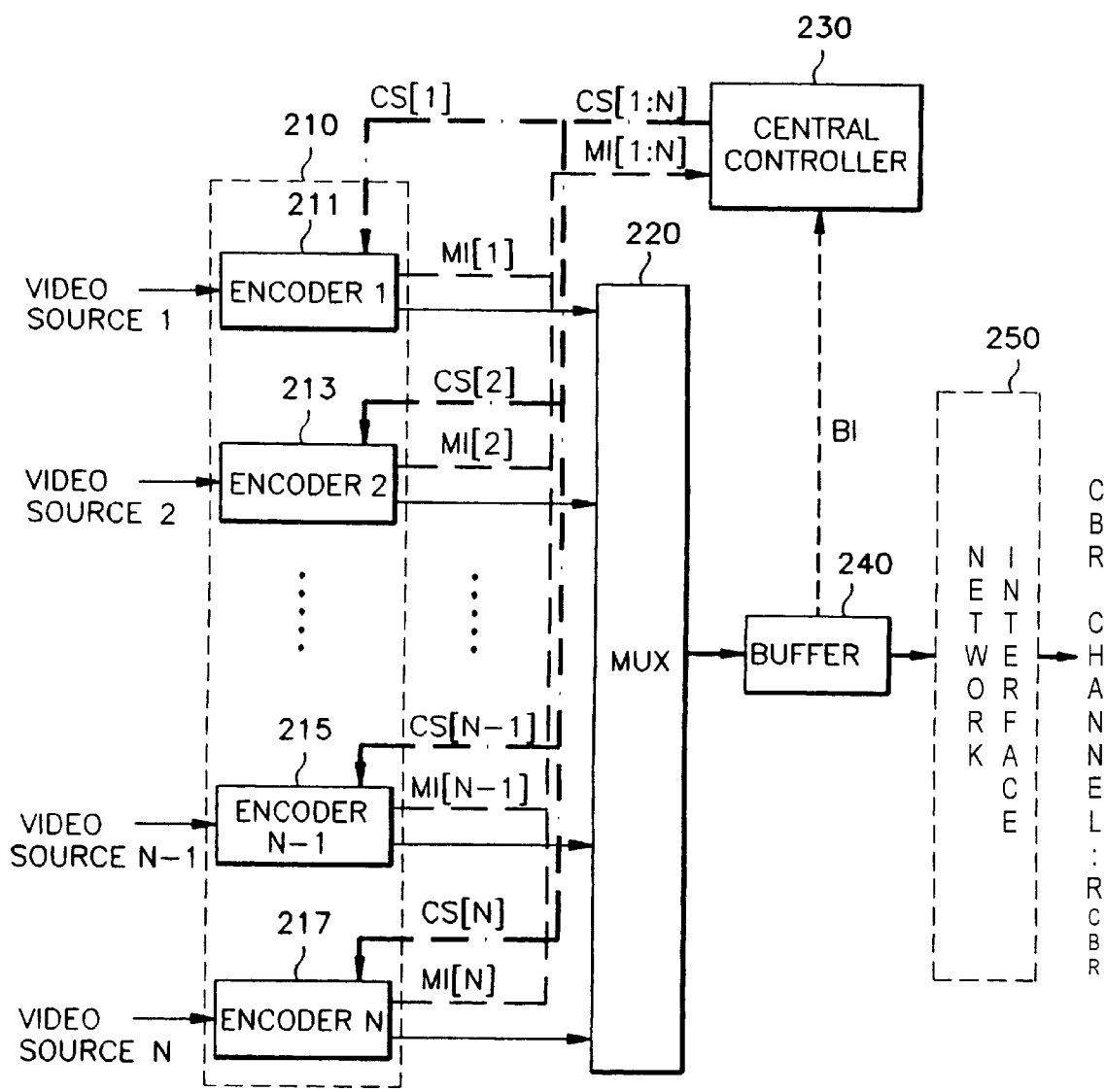
FIG. 2 is a block diagram showing a video encoding apparatus for multiple video transmission according to an embodiment of the present invention.

FIG. 2 shows a video encoding apparatus for multiple video transmission according to an embodiment of the present invention.

As shown in FIG. 2, the video encoding aparatus includes an encoding unit 210 for encoding respective video programs received from each of video sources 1 to video sources N under control from a central controller 230, a multiplexer (MUX) 220 for multiplexing the outputs of the encoding unit 210, a buffer 240 for storing output bit streams multiplexed by the multiplexer 220, a network interface 250 for modulating the output bit streams of the buffer 240 and transmitting the output through a channel, and the central controller 230 for receiving informations necessary for control from the encoding unit 210 and informations with respect to buffer fullness from the buffer 240 and providing quantization parameters to be applied to the picture to be now encoded with respective encoders 211, 213, 215, and 217.

An operation of the video encoding apparatus will now be described in detail.

N video programs Video Source 1 to Video Source N, which will be encoded and transmitted via a single channel, are received to the plurality of encoders 211, 213, 215, and 217 and then are encoded. Bit streams output from the plurality of encoders 211, 213, 215, and 217 are multiplexed by the multiplexer 220 and then are stored in the buffer 240.

The bit streams output from the buffer 240 are modulated by network interface 250 and then are transmitted via the CBR channel to a receiver.

Picture quality of the respective programs to be now encoded and a bit generating amount are controlled by the central controller 230. After the central controller 230 receives the monitoring informations MI[1:N] necessary for control from the respective encoders 211, 213, 215, and 217 and the information BI with respect to the buffer fullness from the buffer 240 and provides the quantization parameters CS[1:N] to be applied to the picture to be now encoded with the respective encoders 211, 213, 215, and 217 which are encoded according to the control signal, i.e., quantization parameters CS[1:N] from the central controller 230. In this case, quantization parameters for the respective encoders 211, 213, 215, and 217 are applied per frame. That is, the same quantization parameter is applied within one frame. Therefore, a relatively consistent picture quality can be maintained within one frame.

Figure 3:
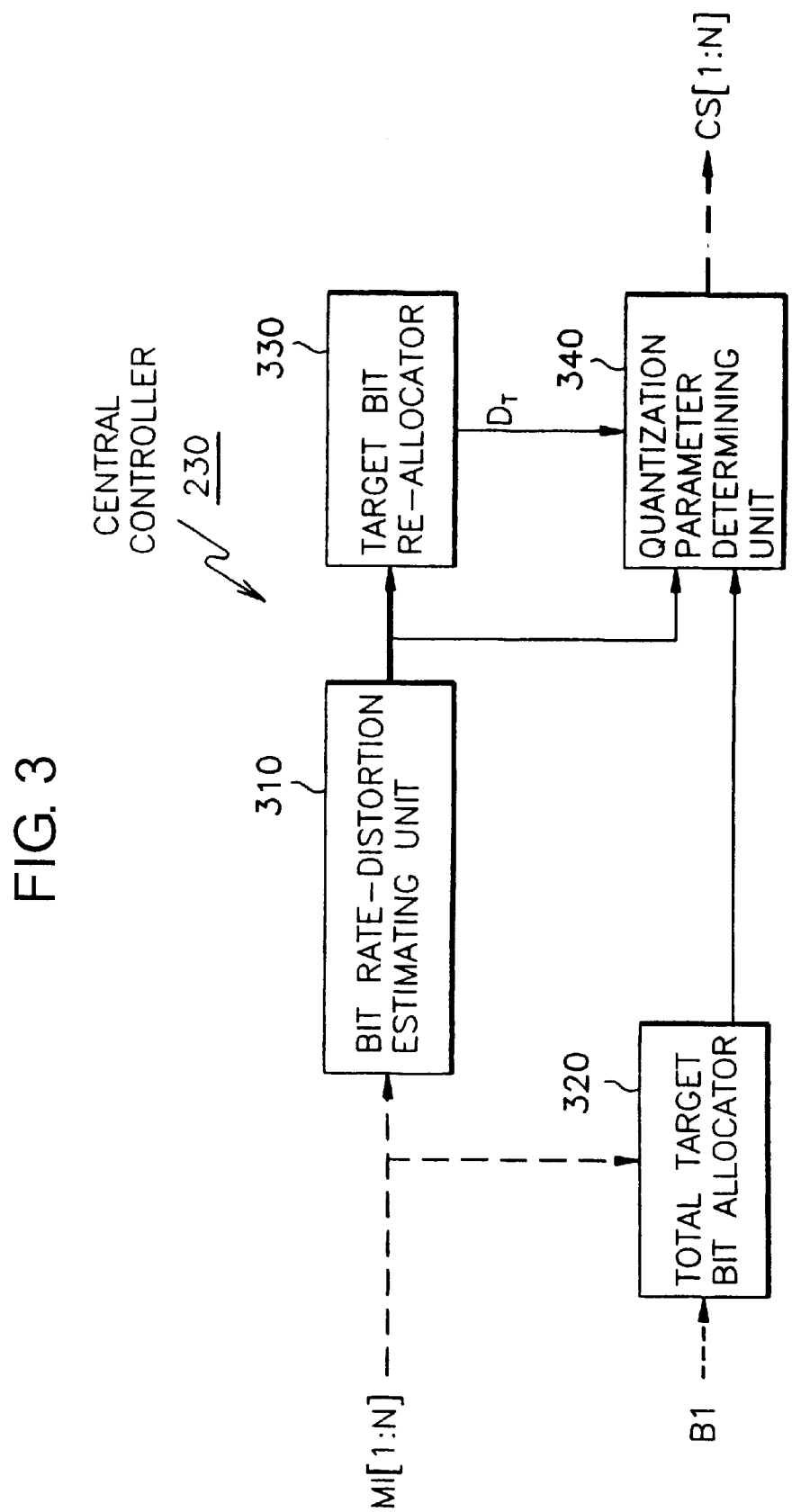
FIG. 3 is a detailed block diagram for a central controller of FIG. 2.

FIG. 3 shows a detailed block diagram for the central controller of FIG. 2. The central controller 230 includes a total target bit allocator 320 for receiving the monitoring informations MI[1:N] necessary for control from the respective encoders 211, 213, 215, and 217 and the information BI with respect to the buffer fullness from the buffer 240 and computing the amount of bits to be allocated to the picture of the total programs to be now encoded, a bit rate-distortion estimating unit 310 for receiving the monitoring informations MI[1:N] necessary for control from the respective encoders 211, 213, 215, and 217 and estimating a distortion and a bit generating amount corresponding to the quantization parameters applied to the present picture of the respective programs, a target bit re-allocator 330 for receiving a total target amount of bits obtained from the total target bit allocator 320, and the bit generating amount and the distortion estimated by the bit rate-distortion estimating unit 310 and distributing to the respective programs, and a quantization parameter determining unit 340 for obtaining quantization parameters to be applied to the present frame of the respective programs to be encoded in accordance with the result of the target bit re-allocator 320 using the output of the bit rate-distortion estimating unit 310.

An operation of the central controller will now be described in detail.

As shown in FIG. 3, the bit rate-distortion estimating unit 310 receives the monitoring informations MI[1:N] necessary for estimating the bit generating amount and the distortion for quantization parameters to be applied from the respective encoders 211, 213, 215, and 217 and obtains estimating values $\hat{E}_k(QPn)$ of the bit generating amount and estimating values $\hat{D}_k(QPn)$ of the distortion corresponding to quantization parameters to be applied to the present frame of the respective programs to be now encoded. Here, k ($1 \leq k \leq N$) is a number of program to be encoded, and QPn means a nth quantization parameter, which is generally $1 \leq n \leq 31$.

When the total target bit allocator 320 receives the monitoring informations from the respective encoders 211, 213, 215, and 217 and determines independently a target amount of bits to be allocated to the present frame of the respective programs, each of the determined target amount of bits are added to obtain the total target amount of bits.

The total target bit allocator 320 receives the information BI with respect to the buffer fullness from the buffer 240 so that the total target amount of bits could be within limits capable of preventing overflow of the buffer 240, and obtains a total target amount of bits $B_T$ computed one times per every frame frequency by rearranging the total target amount of bits.

Then, the target bit re-allocator 330 receives the total target amount of bits $B_T$ from the total target bit allocator 320, and the estimating values $\hat{E}_k(QPn)$ of the bit generating amount and estimating values $\hat{D}_k(QPn)$ of the distortion from the bit rate-distortion estimating unit 310 and obtains a target distortion $D_T$ in order to maintain the most similar picture quality among pictures of all programs when encoding at the total target amount of bits $B_T$ estimated.

Next, the quantization parameter determining unit 340 selects a quantization parameter to produce a distortion close to the target distortion $D_T$ for the picture of the respective programs. That is, after obtaining the quantization parameter QP satisfying a following equation (1) from the result of estimating the distortion for the picture of the respective programs, encoding is performed using the obtained quantization parameter QP.

$$QP = \min_{1 \leq QP \leq 31} \{QP \mid D_T \leq \hat{D}_K(QP)\} \quad (1)$$

where $\hat{D}_k(QP)$ is an estimating value of the distortion generated at the time of applying the quantization parameter QP to the kth program picture to be now encoded. Therefore, the selected quantization parameter QP is the smallest of the quantization parameters QPs which generate the estimated distortion value larger than the target distortion.

Finally, each of the encoders 211, 213, 215, and 217 encodes the respective program pictures by applying the quantization parameter QP selected by means of the output control signal CS[1:N] of the quantization parameter determining unit 340 based on the equation (1), so that all the programs could have the similar picture quality.

Figure 4:
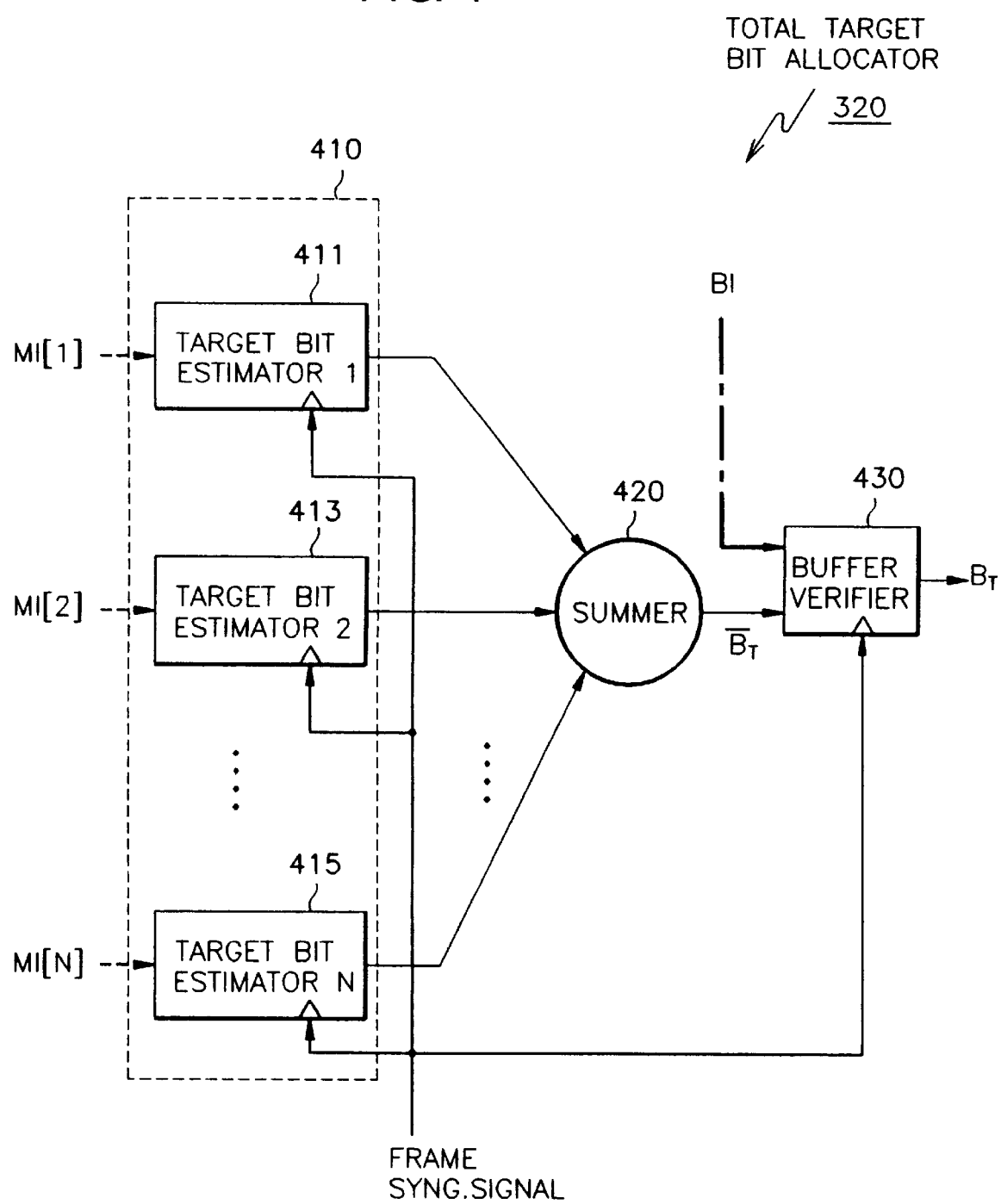
FIG. 4 is a detailed block diagram for a total target bit allocator of FIG. 3.

FIG. 4 is a detailed block diagram showing a detailed structure of a total target bit allocator of FIG. 3.

As shown in FIG. 4, the total target bit allocator 320 includes a target bit estimating unit 410 for receiving an external frame synchronizing signal and informations, from the respective own encoders 211, 213, 215, and 217, necessary for computing the target amount of bits to be used for encoding the present program of the respective programs and determining a target amount of bits to be allocated to the present frame of the respective programs, the target bit estimating unit 410 having a plurality of target bit estimators 411–415, a summer 420 for obtaining the total target amount of bits by adding the target amount of bits for the present frame of the respective programs, and a buffer verifier 430 for receiving the buffer information from the buffer 240 in synchronization with the external frame synchronization signal and the output of the summer 420 and rearranging the total target amount of bits so that the result jointly coded according to the total target amount of bits could be within limits capable of preventing overflow of the buffer 240.

Now, an operation of the total target bit allocator will be described in detail.

The target bit estimating unit 410 corresponding to the respective programs receives the informations MI[1]-MI[N], from the respective own encoders 211, 213, 215, and 217, necessary for computing the target amount of bits to be used for encoding the present program of the respective programs and determines the target amount of bits to be allocated to the present frame of the respective programs.

Where a bit rate of channel to transmit the total programs is RCBR and N programs are transmitted through this channel, estimation of the target amount of bits for the present frame of the respective programs performed in the respective target bit estimators 411–415 is obtained assuming that the respective programs are transmitted through channel having a channel bit rate of $R_{CBR}/N$.

The total target amount of bits is obtained by the summer 420 by adding the target amount of bits for the present frame of the respective programs and the buffer verifier 430 rearranges the total target amount of bits so that the result jointly coded according to the total target amount of bits could be within limits capable of preventing overflow of the buffer 240.

Operational principle of the buffer verifier 430 is as follows:

Since the total target amount of bits estimated and the real amount of bits generated by encoding may be different due to inaccuracy of the estimation of bit rate, overflow of the buffer 240 may be occurred where the target amount of bits is too high. Thus, it is necessary to rearrange the total target amount of bits estimated in consideration of state of the buffer 240.

Where bit streams of all the programs are stored in the buffer 240 having a capacity of $B^e_{max}$ and then, are transmitted through a constant bit rate (CBR) channel having the channel bit rate Of $R_{CBR}$, condition capable of preventing overflow of the buffer 240 is as follows:

$$B^e_i \leq B^e_{max} \forall i \quad (2)$$

$$B^e_i = B^e_{i-1} + E_i - R_{CBR}T \quad (3)$$

where T is a frame frequency, $B^e_i$ is a fullness of the buffer 240 at a time of iT, and $E_i$ is an amount of bits input to the buffer 240 during iT. From equations (3) and (4), limit of $E_i$ capable of preventing overflow of the buffer 240 is as follows:

$$E_i \leq B^e_{max} + R_{CBR}T - B^E_{i-1} (= E_i^{max}) \quad (4)$$

Therefore, the total target amount of bits $\tilde{B}_T$ of the summer 420 is rearranged as follows:

$$B_T = \min(\tilde{B}_T, (1-\gamma)E_i^{max}) \quad (5)$$

where $\gamma$ is a constant to prevent the state of buffer 240 from excessively closing to $B^e_{max}$.

Referring to FIG. 4, the total target bit allocator 320 outputs the total target amount of bits $B_T$ computed one times per every frame frequency by means of the frame synchronization signal.

Figure 5:
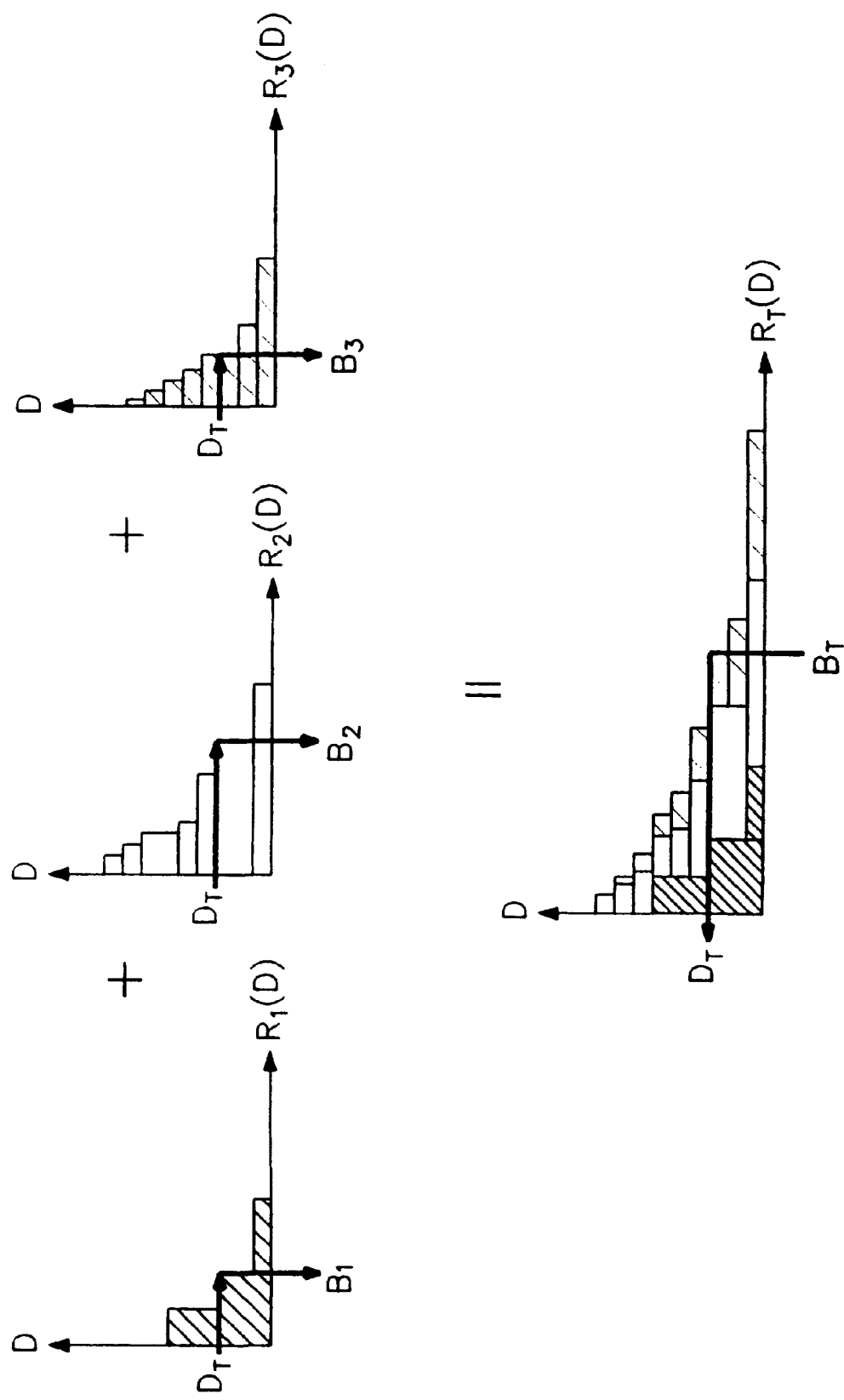
FIG. 5 is a view of explaining a principle for a target bit re-allocator of FIG. 3.

FIG. 5 is a view of explaining a principle for a target bit re-allocator of FIG. 3.

As shown in FIG. 5, after the target bit re-allocator obtains a total bit rate-distortion function $R_T(D)$ by adding, with respect to bit rate axis (horizontal axis), bit rate-distortion functions $R_i(D)$ for the picture of the respective programs to be now encoded, and a distortion DT corresponding to the total target amount of bits $B_T$ from $R_T(D)$, bit amount Bi to be allocated to the picture of ith programs to be now encoded from $D_T$ and $R_i(D)$ is obtained.

As a result, the amount of bits to be allocated to the picture of ith programs to be now encoded is Bi, and the distortion is $D_T$ for all programs. In this case, a graph of the bit rate-distortion for the respective program pictures has a shape of step. In particular, as the present invention, where the same quantization parameter is applied to one picture and the number of applicable quantization parameters is 31, if encoding is performed, the graph of the bit rate-distortion for the respective program pictures may be estimating values of 31 steps and the graph of the total bit rate-distortion mat be the maximum N*31 steps. Where N is the number of programs to be jointly coded.

From the graph of the total bit rate-distortion as constructed above, distortion value corresponding to a point intersecting the graph of the total bit rate-distortion indicates the target distortion $D_T$.

Figure 6:
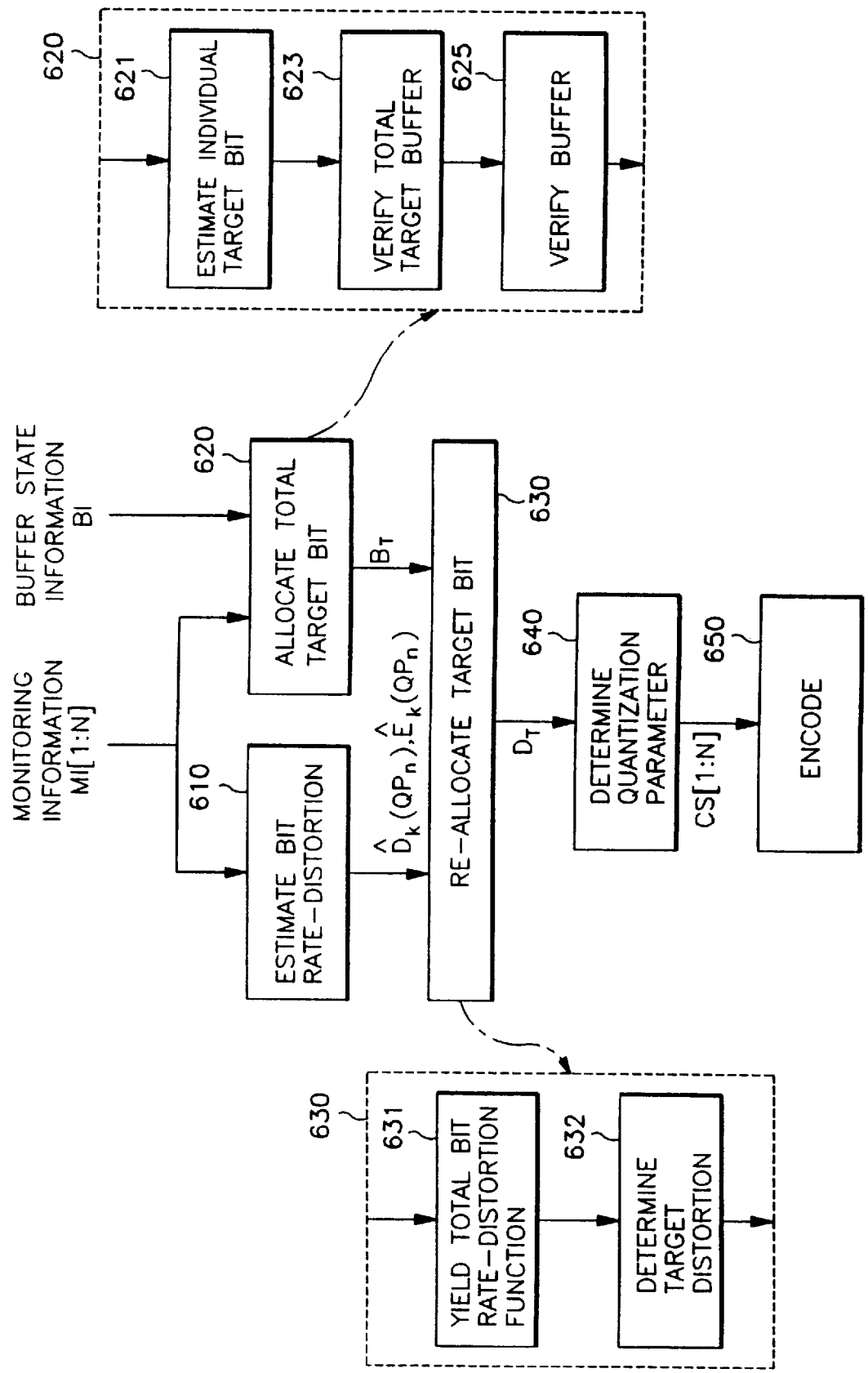
FIG. 6 is a flow chart of a video encoding method for multiple video transmission according to an embodiment of the present invention.

FIG. 6 is a flow chart of a video encoding method for multiple video transmission according to an embodiment of the present invention.

As shown in FIG. 6, the video encoding method for multiple video transmission of the present invention comprises a bit rate-distortion estimating step, a total target bit allocating step, a target bit re-allocating step, a quantization parameter determining step, and an encoding step.

In the bit rate-distortion estimating step (step 610), when receiving the monitoring informations MI[1:N] necessary for estimating the bit generating amount and the distortion for quantization parameters to be applied from the respective encoders 211, 213, 215, and 217, estimating values $\hat{E}_R(QPn)$ of the bit generating amount and estimating values $\hat{E}_R(QPn)$ of the distortion corresponding to quantization parameters to be applied to the present frame of the respective programs to be now encoded are obtained. Here, k ($1 \leq k \leq N$) is a number of program to be encoded, and QPn means a nth quantization parameter, which is generally $1 \leq n \leq 31$.

The total target bit allocating step (step 620) includes an individual target bit estimating step (step 621), a total target bit estimating step (step 623), and a buffer verifying step (step 625). In the individual target bit estimating step (step 621), when receiving, from the respective own encoders 211, 213, 215, and 217, the monitoring informations MI[1:N] necessary for computing the target amount of bits to be used for encoding the present program of the respective programs, a target amount of bits to be allocated to the present frame of the respective programs is determined independently.

Next, the total target bit estimating step (step 623) is to add each of the determined target amount of bits for the present frame of the respective programs so as to obtain the total target amount of bits.

Then, at the buffer verifying step (step 625), when receiving information $B_T$ for the buffer fullness from the buffer 240, the total target amount of bits is rearranged so that the result jointly coded according to the total target amount of bits could be within limits of not generating overflow of the buffer 240.

Through such steps, the total target amount of bits $B_T$ computed one times per every frame frequency is obtained.

Subsequently, the target bit re-allocating step (step 630) including a total bit rate-distortion function yielding step (step 631) and a target distortion determining step (step 632) is performed to estimate a target distortion $D_T$ for maintaining the most similar picture quality among pictures of all programs when jointly coding at the total target amount of bits $B_T$ estimated.

At the total bit rate-distortion function yielding step (step 631), using the result of the bit rate-distortion estimation obtained from the bit rate-distortion estimating step (step 610), the total bit rate-distortion function $R_T(D)$ is obtained by adding, with respect to bit rate axis, bit rate-distortion functions $R_i(D)$ for the picture of the respective programs to be now encoded. Then, at the target distortion determining step (step 632), the target distortion DT corresponding to the total target amount of bits BT from the total bit rate-distortion function $R_T(D)$ is obtained.

Next, the quantization parameter determining step (step 640) is performed to select the quantization parameter in order to produce a distortion close to the target distortion $D_T$ for the picture of the respective programs. That is, according to this step, the quantization parameter QP satisfying the above equation (1) from the result of estimating the distortion for the picture of the respective programs is obtained. Therefore, the selected quantization parameter QP is the smallest of the quantization parameters QPs which generate the estimated distortion value $\hat{D}_k(QPn)$ for the picture of the respective programs to be now encoded larger than the target distortion $D_T$.

Finally, the encoding step (step 650) is performed to receive the quantization parameter QP as control signals CS[1:N] for each of the encoders 211, 213, 215, and 217 for encoding the respective program pictures and to encode one program picture.

Since the total bit rates of all the multiplexed video programs to be jointly coded is maintained constantly, but each of the video programs allows for variable bit rate (VBR) compression, the present invention has more improved average picture quality than independent coding method for performing constant bit rate (CBR) compression for the respective programs and does not produce the picture having notable distortion. Since the picture quality among all the programs which are jointly coded is very uniform, fair services can be provided with all viewers.

Further, since a minimum picture quality of the programs jointly coded is more improved than the video programs independently coded, the number of programs capable of transmitting through a channel having the same band width is increased.

This invention is applicable in transmitting a plurality of multiplexed video programs over a channel of allowing for a constant bit rate (CBR) in the digital satellite broadcast, cable TV, and digital terrestrial broadcast.

Although the invention has been described with reference to particular embodiments, the description is only an example of the invention's application and should not be taken as a limitation. Various adaptation and combinations of features of the embodiments disclosed are within the scope of the invention as defined by the following claims.

What is claimed is:

1. A video encoding apparatus for multiple video programs transmission comprising:
    a plurality of encoding means for encoding each of a plurality of video programs received from external;
    multiplexing means for multiplexing outputs of the plurality of encoding means;
    storing means for temporarily storing and transmitting signal multiplexed by the multiplexing means; and
    central controlling means for receiving monitoring information necessary for control from the plurality of encoding means and information with respect to storing means fullness from the storing means and providing quantization parameters to be applied to respective pictures to be now encoded with the respective encoding means, wherein said central controlling means comprises:
        total target bit allocating means for receiving the monitoring information necessary for control from the plurality of encoding means and the information with respect to the storing means fullness from the storing means and computing a total target amount of bits to be allocated to the picture of the total programs to be now encoded;
        bit rate-distortion estimating means for receiving the monitoring information necessary for control from the plurality of encoding means and estimating a distortion and a bit generating amount corresponding to the quantization parameters applied to the present Picture of the respective programs; and
        control signal generating means for receiving a total target amount of bits obtained from the total target bit allocating means and distributing to the respective programs, obtaining quantization Parameters to be applied to the present frame of the respective programs to be encoded, and providing respective control signals with the respective encoding means.

2. A video encoding apparatus according to claim 1, wherein said control signal generating means comprises:
    target bit re-allocating means for receiving the total target amount of bits obtained from the total target bit allocating means and distributing to the respective programs; and
    quantization parameter determining means for obtaining the quantization parameters to be applied to the present frame of the respective programs to be encoded using the output of the bit rate-distortion estimating means in accordance with the result of the target bit re-allocating means, and providing respective control signals with the respective encoding means.

3. A video encoding apparatus according to claim 1, wherein said total target bit allocating means comprises:
    a plurality of target bit estimating means for receiving an external frame synchronizing signal and the informations necessary for control from the respective own encoding means and determining a target amount of bits to be allocated to the present frame of the respective programs;
    summing for obtaining the total target amount of bits by adding the target amount of bits for the present frame of the respective programs; and
    verifying means for receiving a storing means information from the storing means and rearranging the total target amount of bits.

4. A video encoding method for multiple video programs transmission comprising steps of:
    (a) allocating a total amount of bits to be allocated to all pictures to be encoded per every frame frequency;
    (b) receiving a plurality of monitoring information from respective encoders and estimating a plurality of estimating values of bit generating amounts and a plurality of estimating values of distortions corresponding to quantization parameters to be applied to present frames of respective programs to be encoded;
    (c) estimating a target distortion to be generated when all the programs jointly coded according to the total target amount of bits maintains closest picture qualities; and (d) selecting quantization parameters to be used for encoding so that distortions generated from the respective programs which are encoded is closest to a target distortion, and encoding the respective program pictures using the selected quantization parameters.

5. A video encoding method according to claim 4, wherein said step (a) comprises steps of:

(a-1) receiving, from the respective own encoders, the monitoring information necessary for computing a target amount of bits to be used for encoding the present program of the respective programs, and determining independently a target amount of bits to be allocated to the present frame of the respective programs;

(a-2) adding each of the target amount of bits for the present frame of the respective programs so as to obtain the total target amount of bits; and (a-3) receiving information for buffer fullness from a buffer, and reallocating the total target amount of bits so that results jointly coded according to the total target amount of bits could be within limits of not generating overflow of the buffer.

6. A video encoding method according to claim 4, wherein said step (c) comprises steps of:

(c-1) estimating a target distortion for maintaining the most similar picture quality among pictures of all programs when jointly coding at the total target amount of bits rearranged;

(c-2) obtaining a total bit rate-distortion function by adding, with respect to a bit rate axis, bit rate-distortion functions for the picture of the respective programs to be now encoded using the result of the bit rate-distortion estimation; and (c-3) obtaining from the total bit rate-distortion function, the target distortion corresponding to the total target amount of bits rearranged.

\* \* \* \* \*